(12) United States Patent
Barten

(10) Patent No.: US 7,196,284 B2
(45) Date of Patent: Mar. 27, 2007

(54) WELDING GUN HAVING ROTATIONAL SWIVEL COUPLING

(76) Inventor: Charles Barten, 712 Aspen St., South Milwaukee, WI (US) 53172

( * ) Notice: Subject to any disclaimer, the term of this patent is extended or adjusted under 35 U.S.C. 154(b) by 170 days.

(21) Appl. No.: 11/034,039

(22) Filed: Jan. 12, 2005

(65) Prior Publication Data

US 2005/0150884 A1 Jul. 14, 2005

Related U.S. Application Data

(60) Provisional application No. 60/535,944, filed on Jan. 13, 2004.

(51) Int. Cl.
*B23K 9/24* (2006.01)
(52) U.S. Cl. .............. 219/137.63; 219/137.31
(58) Field of Classification Search .......... 219/137.31, 219/137.9, 137.63
See application file for complete search history.

(56) References Cited

U.S. PATENT DOCUMENTS

| | | | |
|---|---|---|---|
| 3,488,468 A * | 1/1970 | Carbone ............ | 219/136 |
| 3,689,733 A | 9/1972 | Matasovic | |
| 4,072,828 A * | 2/1978 | Thome ............ | 219/137.31 |
| 4,496,823 A | 1/1985 | Mann | |
| 4,549,068 A | 10/1985 | Kensrue | |
| 4,727,238 A | 2/1988 | Mann | |
| 4,945,209 A | 7/1990 | Mann | |
| 5,338,917 A | 8/1994 | Stuart et al. | |
| 5,728,995 A | 3/1998 | Kensrue | |
| 5,874,709 A | 2/1999 | New et al. | |
| D407,727 S | 4/1999 | Kunz | |
| 5,916,465 A * | 6/1999 | New et al. ............ | 219/138 |
| 6,075,227 A * | 6/2000 | Lajoie ............ | 219/137.61 |
| RE36,997 E | 12/2000 | Kensrue | |
| 6,419,417 B1 * | 7/2002 | Zigliotto ............ | 403/279 |
| 2003/0127443 A1 | 7/2003 | Doherty | |

\* cited by examiner

*Primary Examiner*—Len Tran
(74) *Attorney, Agent, or Firm*—Ryan Kromholz & Manion, S.C.

(57) ABSTRACT

A welding gun having a swivel coupling joining the posterior end of the gun to the handle thereby allowing the handle and gooseneck to be rotated without having to rotate the posterior end of the gun and the wire cable feed line, the swivel coupling providing a conduit for welding gun wires and hoses and limiting the rotational range of the handle, thereby reducing stress to the wires and hoses.

18 Claims, 4 Drawing Sheets

WELDING GUN HAVING ROTATIONAL SWIVEL COUPLING

RELATED APPLICATION

This application claims priority to U.S. Provisional Patent Application No. 60/535,944, entitled "180 Degree Welding Gun Rotational Swivel Coupling" filed Jan. 13, 2004, the entire contents of which is incorporated herein.

FIELD OF THE INVENTION

This disclosure concerns Metal Inert Gas (MIG) welding and, more particularly an ergonomic welding gun assembly having a rotatable handle.

BACKGROUND OF THE INVENTION

MIG welding systems have been widely used in the United States and other places around the world since at least the 1960's. In MIG type welding, a welding wire is utilized to provide a molten metal pool in order to join metal pieces together. MIG welding systems utilize a continuous welding wire that is rolled onto a spool and fed through coaxial welding cable to the welding gun. A MIG welding gun has a handle having a trigger that when pressed, gas and wire are fed to the gun from the attached cable and to the welding tip. Because of the continuous welding wire, MIG welding systems are generally faster than Tungsten Inert Gas (TIG) systems or conventional stick welding systems that utilize individual welding rods.

The primary components of a MIG welding system which are well known to those skilled in the art, are shown in FIG. 1 and generally indicated at 8. The welding power source 10 connects to an AC power supply 12 which is shown diagrammatically.

Also connected to the welding power source 10 is a high pressure gas cylinder 14 which typically contains an inert gas such as argon or perhaps a combination of argon and carbon dioxide. A shut-off valve 16 is attached to the high pressure cylinder 14. A regulator 18 is connected via piping to the valve 16 and typically reduces the pressure of the inert gas downstream from the regulator. A pressure gauge 20 provides a visual display of the gas pressure in the cylinder 14. A high pressure hose 22 provides fluid communication for the inert gas to the welding power source 10. The flow meter 21 is in fluid communication with the regulator 18 and the high pressure hose 22.

The welding wire 24 is coiled on a spool 26. The welding wire 24 can be a copper coated ferrous wire, a stainless steel wire, a flux cored wire, etc. The spool 26 is mounted on a reel 28 which is typically positioned on top of the welding power source 10. The welding wire feeder assembly 30 advances the welding wire from the spool 26 to the welding gun 1. The welding wire feeder assembly 30 includes two or more rollers 32 and 34 which grip the welding wire 24 and mechanically advance it from the spool 26 to the welding gun 1.

Control wires 9 are releasably connected on one end to the rear connector 40 and on the other end to the welding power source 10 or to the wire feeder assembly 30. The trigger 55 on the welding gun 1 actuates the welding power source 10 by closing the control circuit. Control wires 9 connect the trigger 55 to the welding power source 10, and are typically encased in the welding cable 42.

The coaxial welding cable 42 connects on one end to the rear connector 40 and on the other end to the welding gun 1. In this example, the workpiece 47 consists of a first plate 44 and a second plate 46 which are being welded together. A ground clamp 48 is attached to the workpiece 47 to complete the electrical circuit. A cable 50 electrically connects the welding power source 10 with the ground clamp 48.

In a typical MIG system, the workpiece is negative and the welding wire 24 is positive. The electrical circuit for a typical MIG welding system is completed as follows: The welding power source 10 connects to a cable 50 at the end of which is the ground clamp 48. The ground clamp 48 is manually attached by the welder to the workpiece 47. An electrical arc is created between the workpiece 47 and the welding wire 24 which causes the welding wire to melt into a molten pool thus joining the plats 44 and 46.

In many applications the MIG welding gun provides much less flexibility than the traditional welding system. In a MIG welding gun, the cable that is coupled to the welding gun is generally heavy and resistant. A welder must constantly drag the heavy cable while twisting and turning the gun. As a consequence, the MIG welding gun is difficult to manipulate, necessitating an increased effort on the part of the welder, particularly to the hands, wrists, forearms, elbow, upper arm, and shoulder. Current MIG welding guns resist the supination and pronation movements required for many welding projects. The addition of repetitive twisting type motions subjects the welder to the risk of occupational injuries such as carpel tunnel, cubital tunnel syndrome and rotator cuff injuries. The present invention is an improvement over previous MIG welding systems.

SUMMARY OF THE INVENTION

A MIG welding gun having a handle section rotatable with respect to a base section. Rotation is brought about by a swivel coupling that connects the handle section to the base section. The swivel coupling permits rotation of the handle section free of the base section. Gas cable(s) and wire(s) may pass through the base section, the swivel coupling, and the handle. The swivel coupling accommodates the gas cable(s) and wire(s) and prevents over-twisting and wear thereto by limiting the degree of rotation of the handle section with respect to the base section.

DETAILED DESCRIPTION OF PREFERRED EMBODIMENT

Figure 1:
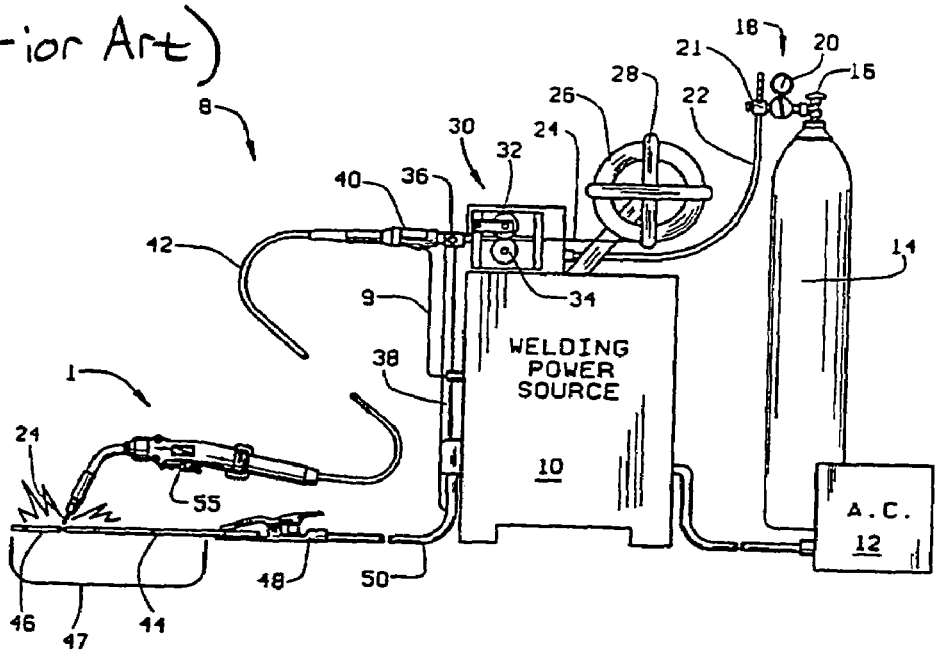
FIG. 1 is a diagrammatic representation of a typical MIG welding system (prior art).
Figure 2:
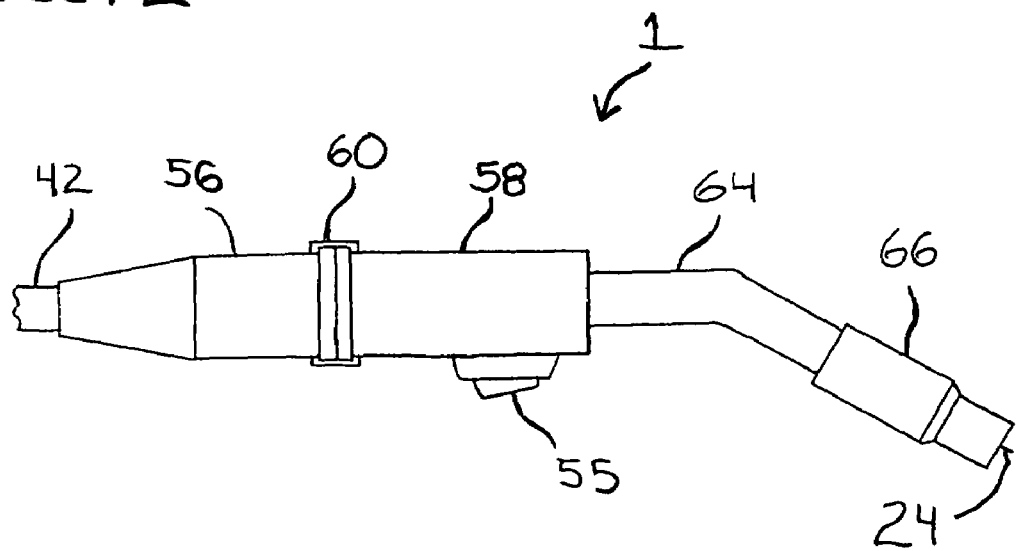
FIG. 2 is a side elevation view of an exemplary MIG welding gun having the swivel coupling of the present invention joining the base section to the handle section.

FIG. 2 is a side elevation view of a preferred version of the MIG welding gun 1 of the present invention. The MIG welding gun 1 has a posterior 56 joined to a handle section 58 through a swivel couple 60. The posterior 56 receives the coaxial welding cable 42. A gooseneck 64 is attached to the front of the handle section 58, and a nozzle 66 is attached to the opposite end of the gooseneck 64. The welding wire 24 protrudes slightly beyond the nozzle 66.

Figure 3:
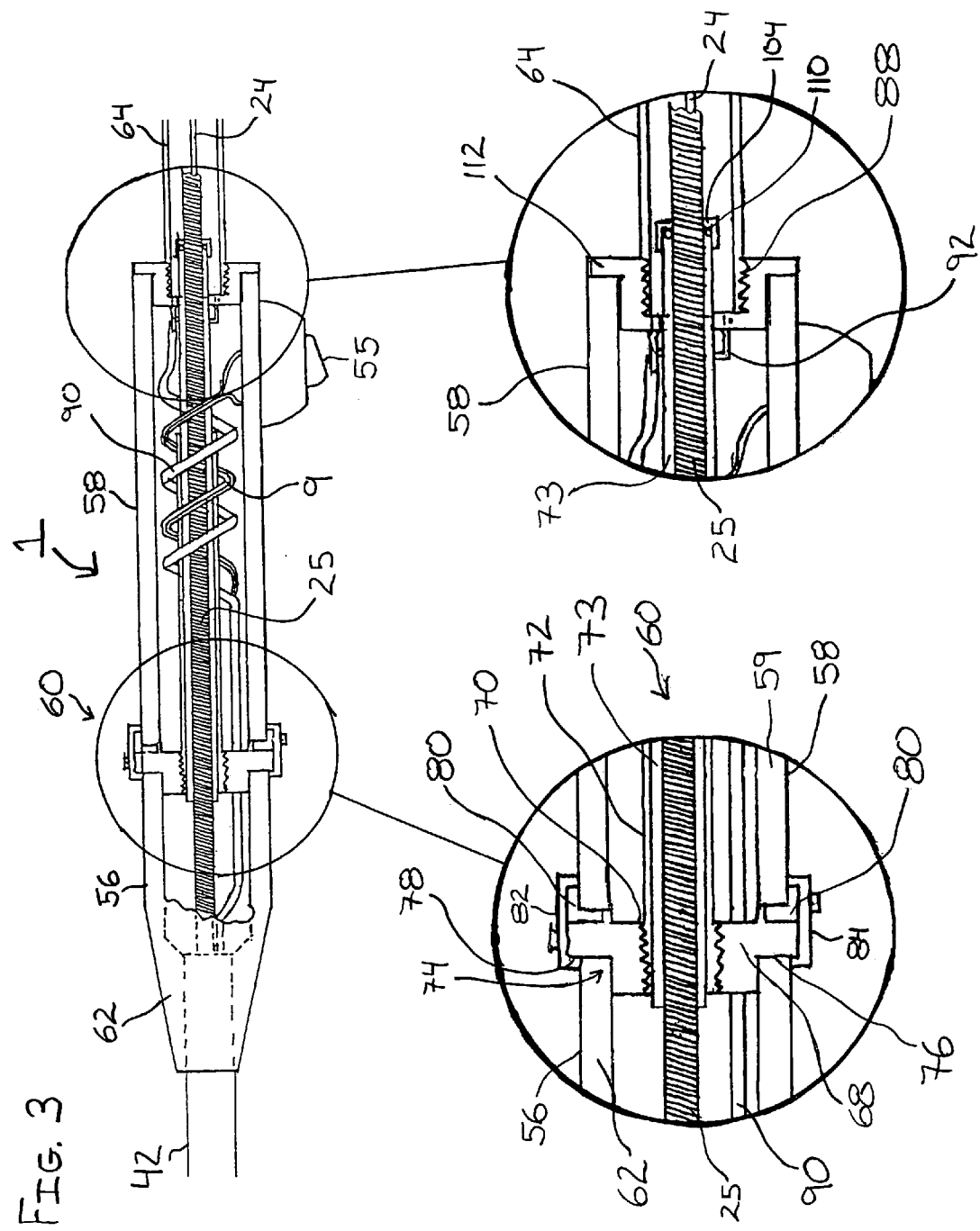
FIG. 3 is a side view of a preferred version of the welding gun of the present invention having sections removed to show components.
Figure 4A:
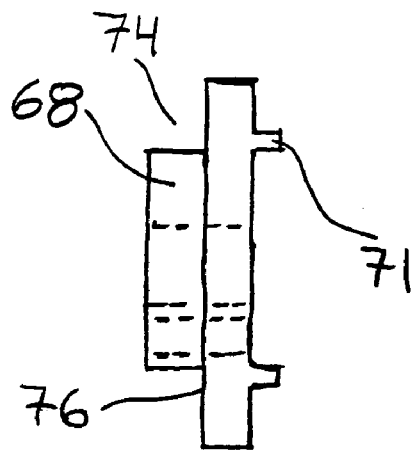
FIGS. 4(*a*) and 4(*b*) are front and side views of the preferred base of the swivel coupling of the welding gun of FIG. 3.
Figure 4B:
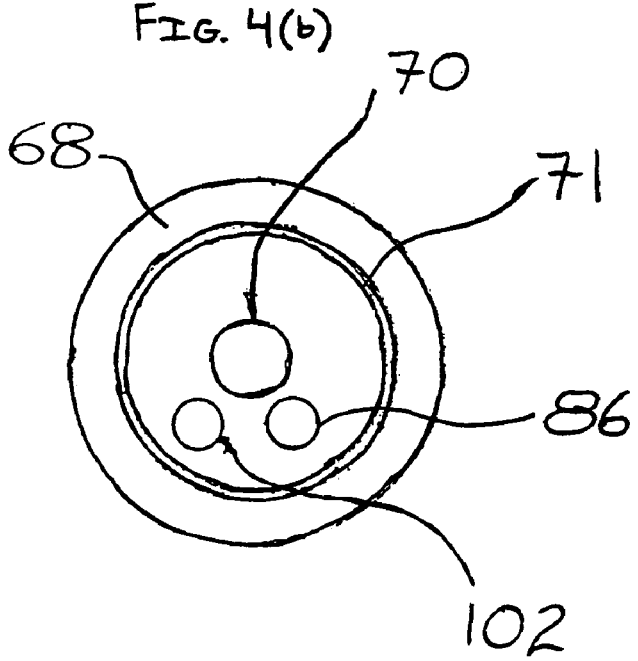

Referring now to FIG. 3, the posterior 56 of the welding gun 1 has an outer casing 62 attached to a base 68 (also shown in FIGS. 4(a) and 4(b)) at the inner circumferential area 76 of a recess 74. A stop clip 82 is attached to the base 68, preferably with a screw. The base 68 has a threaded central aperture 70 for receiving an outer guide tube 58, and has a hose aperture 102, and a wire aperture 86.

Figure 5A:
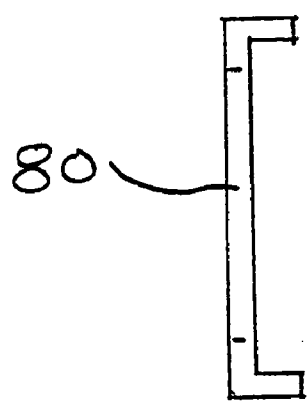
FIGS. 5(*a*) and 5(*b*) are front and side views of the preferred ring of the swivel coupling of the welding gun of FIG. 3.
Figure 5B:
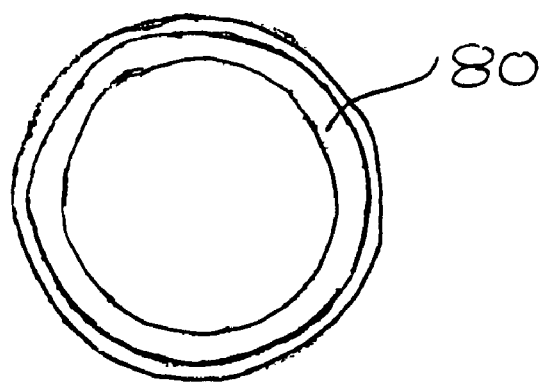

The handle section 58 has a handle casing 59 attached to a ring 80 (also shown in FIGS. 5(a) and 5(b)). The ring 80 is seated on a ring guide 71 that is part of the base 68. A rotatable clip 84 is attached to the ring 80, preferably with a screw. A welding wire liner 25 traverses the welding gun 1 and is guided therethrough by an inner guide tube 73.

Figure 6A:
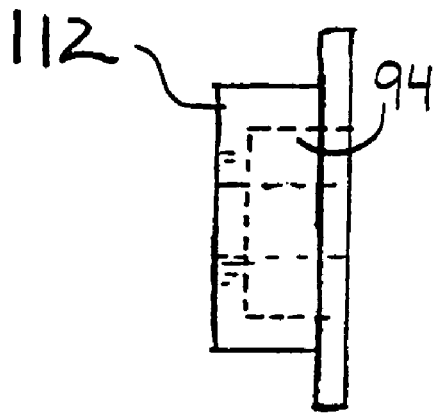
FIGS. 6(*a*) and 6(*b*) are front and side views of the preferred end cap of the welding gun of FIG. 3.
Figure 6B:
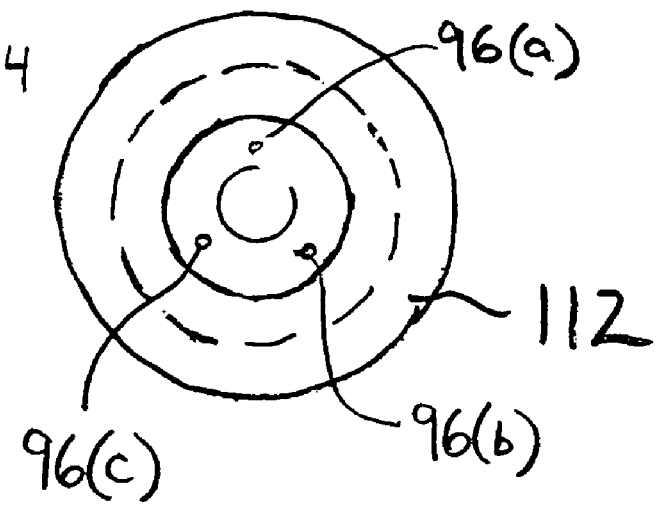
Figure 7A:
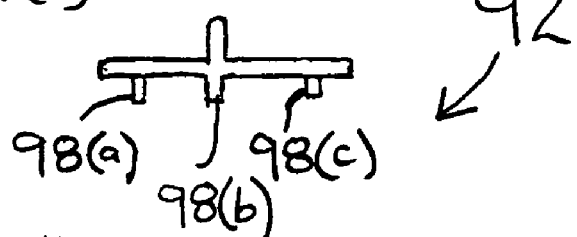
FIGS. 7(*a*), 7(*b*), and 7(*c*) are front, top and side views of a preferred gas tube adaptor of the welding gun of FIG. 3.
Figure 7B:
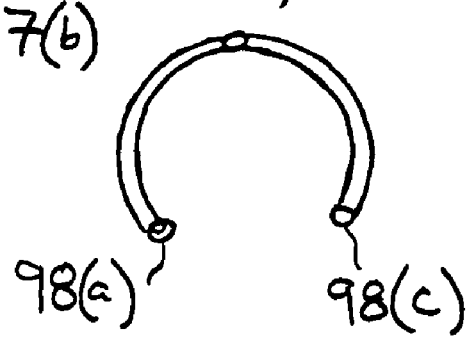
Figure 7C:
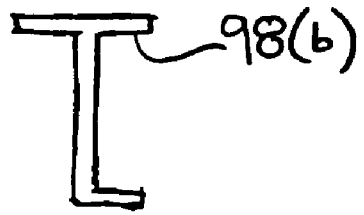

In the preferred version, the control wires 9 pass through the wire aperture 86, are flaccidly pre-wrapped around the outer guide tube 72 approximately two to three turns, and are connected to the trigger 55. The gas tube that passes through the hose aperture 102 is also pre-wrapped around the outer guide tube 72, and is connected to a gas tube adaptor 92 (also shown in FIGS. 7(a) to 7(c)). The gas tube adaptor 92 is preferably brazed to an end cap 112 (also shown in FIGS. 6(a) and 6(b)). The end cap 112 is attached to the handle casing 59 and has a threaded aperture 94 for attachment to the gooseneck 64. In the preferred version the end cap 112 has three apertures for receiving the outlets, 98(a) to 98(c), of the gas tube adaptor 92. The inlet 100 of the gas tube adaptor 92 is connected to the gas tube 90. The inner guide tube 73 passes through an aperture in the end cap 112, and is sealed with an O-ring 110 and nut 104.

Referring back to FIG. 3, it should now be realized that as a welder rotates the handle casing 59, the end cap 112, the gooseneck 64, the end of the welding wire liner 25 and welding wire 24 will also rotate, without rotation of the posterior 56. Rotation of the handle section 58 with respect to the posterior 56 is limited to approximately one-hundred and eighty degrees: As the welder rotates the handle in either direction, the stop clip 82 and base 68 remain stationary, while the rotating clip 84 rotates with the handle. The rotating clip 84 approaches the stop clip 82, and contact is made at (approximately) zero and one-hundred eighty degrees, thereby preventing further rotation, tearing, and accelerated wear to the internal gas tube 90 and wires 9. It is particularly advantageous that a welder may activate the trigger 55 and apply a weld while rotating the handle.

It is understood that the invention is not confined to the particular construction and arrangement of parts herein illustrated and described, but embraces all such modified forms thereof as come within the scope of the claims. For example, the swivel coupling 60 may be modified for use in welding guns other than the version illustrated. The posterior 56 and handle casing 59 can be shaped a number of ways and can be made out of a number of materials. In one version the posterior 56 and handle casing 59 are constructed of molded resin or rubber and are glued to the base and end cap, respectively. Preferably, the outer casing 62 is contoured to fit a user's hand, such as rectangularly shaped with rounded corners. In this version it is preferred that the handle casing 59 comprise two halves connected with screws, so that the casing may be removed for maintenance. It is preferred that several of the moving parts, such as the base 68, be formed from brass, or some other metal that is "corrosive tolerant," and be coated with silicone or Teflon®. Alternatively, washers may be used between moving parts. Other variations may pertain to the channel through which the welding wire traverses the welding gun; the shape of the stops; the number of stops (for example, the range of rotation may be further limited by using wider stops); and means for securing the outer guide to the base. These and additional alterations and modifications are considered to be within the scope of the following claims.

The invention claimed is:

1. A swivel welding gun, having:
   a. a posterior connected to a welding gun feed line;
   b. a swivel coupling having a first end attached to the posterior and having a second end opposite the first end, the swivel coupling having a stop clip in rotational relationship with the posterior;
   c. a handle having a user activation trigger and connected to the second end of the swivel coupling; and
   d. a rotating clip in rotational relationship with the handle, wherein the rotating clip may contact the stop clip as the handle is rotated.

2. The swivel welding gun of claim 1 wherein the stop clip limits rotation of the handle to approximately one-hundred and eighty degrees.

3. The swivel welding gun of claim 1 wherein the swivel coupling further has a base joined to the posterior, the base having one wire aperture and one gas hose aperture.

4. The swivel welding gun of claim 1 wherein the handle comprises an outer casing having a proximate end supported by the swivel coupling, and a distal end in contact with an end cap.

5. The swivel welding gun of claim 4 further comprising a gooseneck connected to the end cap.

6. The swivel welding gun of claim 3 having a welding wire traversing the posterior, swivel coupling, and handle and supported by an outer guide tube connected to the base and an inner guide tube connected to the end cap.

7. The swivel welding gun of claim 1 wherein the swivel coupling comprises a base frictionally coupled to a ring attached to the handle.

8. The swivel welding gun of claim 5 further comprising a gas tube adaptor having an inlet connected to a gas tube and at least one outlet traversing an aperture in the end cap.

9. The swivel welding gun of claim 1 further comprising a base connected to the posterior and wherein the stop clip is connected to the base.

10. The swivel welding gun of claim 3 wherein the swivel coupling comprises a ring connected to the handle and seated on the base.

11. A swivel welding gun comprising:
   a. a swivel coupling situated between a welding gun posterior and a handle and through which welding wire may pass; and
   b. an end cap supporting an inner sleeve that is coupled to an outer sleeve, the outer sleeve connected to the swivel coupling;
   wherein the handle has a casing having a casing first end connected to the end cap and a casing second end adjacent the swivel coupling.
   wherein the swivel coupling has a wire aperture and a gas tube aperture, the welding gun further comprising an activation wire and an inert gas tube passing through the wire aperture and gas tube aperture, respectively; and wherein the swivel coupling has a stop clip in rotational relation to the welding gun posterior and a rotational clip in rotational relation to the handle casing, the stop clip limiting rotation of the rotational clip.

12. The swivel welding gun of claim 11 further comprising a gas tube adaptor having an input connected to the inert gas tube and an outlet traversing an end cap aperture.

13. The swivel welding gun of claim 11 wherein the swivel coupling has a base connected to the posterior, the base having one wire aperture.

14. The swivel welding gun of claim 13 wherein the swivel coupling comprises a ring connected to the handle and seated on the base.

15. The swivel welding gun of claim 13 wherein the outer sleeve is connected to the base.

16. A swivel welding gun having:
   a. a gooseneck;
   b. a handle attached to the gooseneck and having a casing;
   c. a rotatable clip connected to the casing; and
   d. a stop clip fixed at a location such that the rotatable clip may contact the stop clip as the handle is rotated.

17. The swivel welding gun of claim 16 wherein the stop clip prevents rotation of the handle above one-hundred and eighty degrees.

18. The swivel welding gun of claim 15 further comprising an end cap connected to the handle and supporting an inner sleeve that is coupled to an outer sleeve, the outer sleeve connected to a base supporting the outer sleeve.

* * * * *

UNITED STATES PATENT AND TRADEMARK OFFICE
CERTIFICATE OF CORRECTION

| | |
|---|---|
| PATENT NO. | : 7,196,284 B2 |
| APPLICATION NO. | : 11/034039 |
| DATED | : March 27, 2007 |
| INVENTOR(S) | : Charles Barten |

It is certified that error appears in the above-identified patent and that said Letters Patent is hereby corrected as shown below:

Column 4, line 64, after "coupling" delete " . " and substitute -- ; -- (semi-colon)

Signed and Sealed this

Twelfth Day of June, 2007

JON W. DUDAS
*Director of the United States Patent and Trademark Office*